(12) United States Patent
Song et al.

(10) Patent No.: US 11,960,662 B2
(45) Date of Patent: Apr. 16, 2024

(54) METHOD FOR DETERMINING MOVEMENT TRAJECTORY, AND ELECTRONIC DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Zeyu Song, Beijing (CN); Yaohui Wang, Beijing (CN); Zhengang Gao, Beijing (CN); Tianxiao Yang, Beijing (CN); Yanjun Sun, Beijing (CN); Lei Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 391 days.

(21) Appl. No.: 17/417,810

(22) PCT Filed: May 26, 2020

(86) PCT No.: PCT/CN2020/092307
§ 371 (c)(1),
(2) Date: Jun. 24, 2021

(87) PCT Pub. No.: WO2020/244420
PCT Pub. Date: Dec. 10, 2020

(65) Prior Publication Data
US 2022/0100287 A1 Mar. 31, 2022

(30) Foreign Application Priority Data
Jun. 4, 2019 (CN) .......................... 201910480092.0

(51) Int. Cl.
*G06F 3/0354* (2013.01)
*G01S 17/58* (2006.01)
(Continued)

(52) U.S. Cl.
CPC .......... *G06F 3/03542* (2013.01); *G01S 17/58* (2013.01); *G06F 3/0304* (2013.01); *G06F 3/0383* (2013.01); *G06F 3/0386* (2013.01)

(58) Field of Classification Search
CPC .... G06F 3/0386; G06F 3/0383; G06F 3/0317; G06F 3/03542; G06F 3/03545; G06F 3/0304
See application file for complete search history.

(56) References Cited

U.S. PATENT DOCUMENTS

2005/0073508 A1 4/2005 Pittel et al.
2012/0249489 A1 10/2012 Onodera et al.
(Continued)

FOREIGN PATENT DOCUMENTS

CN 1599894 A 3/2005
CN 101122836 A 2/2008
(Continued)

OTHER PUBLICATIONS

First office action of Chinese application No. 201910480092.0 dated Aug. 19, 2020.
(Continued)

*Primary Examiner* — Deeprose Subedi
(74) *Attorney, Agent, or Firm* — Lippes Mathias LLP

(57) ABSTRACT

A electronic device includes: a body, a light-emitting component, a photosensitive component, and a processor, wherein the light-emitting component, the photosensitive component, and the processor are all disposed in the body, and the photosensitive component is connected to the processor; the light-emitting component is configured to emit probe light; the photosensitive component is configured to acquire optical information about reflected light of the probe light in response to receiving the reflected light; and the processor is configured to determine a movement trajectory (Continued)

of the light-emitting component based on the optical information.

19 Claims, 8 Drawing Sheets

(51) Int. Cl.
*G06F 3/03* (2006.01)
*G06F 3/038* (2013.01)

(56) References Cited

U.S. PATENT DOCUMENTS

| | | |
|---|---|---|
| 2014/0333590 A1 | 11/2014 | Hirata et al. |
| 2016/0132136 A1 | 5/2016 | Otsuki et al. |
| 2020/0052520 A1* | 2/2020 | Kang .................... G06F 1/266 |
| 2021/0208695 A1* | 7/2021 | Byun .................... G06F 3/0383 |

FOREIGN PATENT DOCUMENTS

| | | |
|---|---|---|
| CN | 201837960 U | 5/2011 |
| CN | 102890565 A | 1/2013 |
| CN | 203786682 U | 8/2014 |
| CN | 108664152 A | 10/2018 |
| CN | 109117005 A | 1/2019 |
| CN | 208498050 U | 2/2019 |
| CN | 208673291 U | 3/2019 |
| CN | 110197675 A | 9/2019 |
| KR | 20100023248 A | 3/2010 |
| WO | 2013114453 A1 | 8/2013 |

OTHER PUBLICATIONS

Second office action of Chinese application No. 201910480092.0 dated May 6, 2021.

Rejection decision of Chinese application No. 201910480092.0 dated Nov. 29, 2021.

* cited by examiner

METHOD FOR DETERMINING MOVEMENT TRAJECTORY, AND ELECTRONIC DEVICE

CROSS-REFERENCE TO RELATED APPLICATIONS

This application is a 371 of PCT Application No. PCT/CN2020/092307, filed on May 26, 2020, which claims priority to Chinese Patent Application No. 201910480092.0, filed on Jun. 4, 2019 and entitled "MOBILE STORAGE DEVICE," the disclosure of which is herein incorporated by reference in its entirety.

TECHNICAL FIELD

The present disclosure relates to a method and an apparatus for determining a movement trajectory, and an electronic device.

BACKGROUND

A stylus is an electronic device which is used for handwriting or drawing on a touch panel. In response to any handwrite or draw action, the touch panel is capable of determining a movement trajectory of the stylus based on variations of touch positions of the stylus.

SUMMARY

Embodiments of the present disclosure provide a method and an apparatus for determining a movement trajectory, and an electronic device.

According to a first aspect of embodiments of the present disclosure, an electronic device is provided. The electronic device includes: a body, a light-emitting component, a photosensitive component, and a processor; wherein the light-emitting component, the photosensitive component, and the processor are all disposed in the body, and the photosensitive component is connected to the processor; the light-emitting component is configured to emit probe light; the photosensitive component is configured to acquire optical information about reflected light of the probe light in response to receiving the reflected light; and the processor is configured to determine a movement trajectory of the light-emitting component based on the optical information.

Optionally, the body includes a barrel, and the light-emitting component is disposed at a tip of the barrel.

Optionally, the optical information includes: n images of the reflected light acquired in n times; and the processor is configured to: determine a first characteristic region of an $i^{th}$ image in the n images and a second characteristic region of an $(i+1)^{th}$ image in the n images, wherein $1 \leq i < n$, and a similarity between the first characteristic region and the second characteristic region is greater than a similarity threshold; determine a sub-trajectory of the light-emitting component corresponding to the $i^{th}$ image based on a position of the first characteristic region in the $i^{th}$ image and a position of the second characteristic region in the $(i+1)^{th}$ image; and determine the movement trajectory based on sub-trajectories corresponding to the first n−1 images in the n images.

Optionally, the optical information further includes: information about at least one of a wavelength, a reflection angle, or a light intensity of the reflected light corresponding to a first image in the n images; and the processor is configured to correct last n−1 images in the n images based on the information.

Optionally, the processor is further configured to control the photosensitive component to acquire the optical information.

Optionally, the electronic device further includes: a light-emitting control component disposed in the body; wherein the light-emitting control component is connected to the light-emitting component and configured to control the light-emitting component to emit the probe light.

Optionally, the light-emitting control component includes: a pressure sensor disposed in a pressure sensing region on the body; wherein the pressure sensor is configured to control the light-emitting component to emit the probe light in response to a pressure on the pressure sensing region being greater than a pressure threshold.

Optionally, the electronic device further includes: a light intensity sensor disposed in the body; wherein the light intensity sensor is connected to the processor and configured to detect the light intensity of the reflected light; and the processor is configured to determine the movement trajectory in response to the light intensity being greater than a light intensity threshold.

Optionally, the electronic device further includes: an optical lens disposed in the body, and the photosensitive component is configured to receive the reflected light passing through the optical lens.

Optionally, the optical lens includes a convex lens.

Optionally, the electronic device further includes: a projection component disposed in the body; wherein the projection component is connected to the processor and configured to project the movement trajectory.

Optionally, the body includes: the barrel and a cap, and the projection component is disposed in the cap.

Optionally, the electronic device further includes: a power supply configured to supply power to at least part of electrical components in the electronic device.

Optionally, the body includes: the barrel and the cap; and the power supply is configured to supply power to the at least part of electrical components when the cap is mounted on an end of the barrel opposing to an end of the tip of the barrel.

Optionally, the electronic device further includes: a first port, a second port, a third port and a fourth port; wherein the first port, the power supply, and the second port are all disposed in the barrel, and the first port, the power supply, and the second port are connected in series; and the third port and the fourth port are both disposed in the cap, and the third port is connected to the fourth port; and the first port, the power supply, the second port, the fourth port, and the third port form a power supply circuit when the cap is mounted on an end of the barrel opposing to an end of the tip of the barrel, and the at least part of electrical components are connected in series in the power supply circuit.

Optionally, the electronic device further includes: a power detection component and a prompting component disposed in the body; wherein the power detection component is configured to detect remaining power of the power supply, and the prompting component is configured to display prompt information in response to the remaining power being less than a power threshold.

Optionally, the power detection component and the prompting component are both connected to the processor, and the processor is configured to control the prompting component to display the prompt information in response to the remaining power being less than the power threshold.

Optionally, the electronic device further includes: a memory disposed in the body, wherein the memory is connected to the processor and configured to store the movement trajectory.

Optionally, the electronic device further includes: a deletion component; wherein the deletion component is connected to the memory and configured to delete a movement trajectory in the memory.

Optionally, the electronic device further includes: a transmission component; wherein the transmission component is connected to the memory and configured to transmit the movement trajectory to other devices other than the electronic device.

According to a second aspect of embodiments of the present disclosure, a method for determining a movement trajectory, applicable to any electronic device as defined in the first aspect is provided. The method includes: emitting a probe light by a light-emitting component; acquiring optical information about reflected light of the probe light by a photosensitive component in response to receiving the reflected light; and determining a movement trajectory of the light-emitting component by a processor based on the optical information.

Optionally, the optical information includes: n images of the reflected light acquired in n times; and determining the movement trajectory of the light-emitting component by the processor based on the optical information includes: determining a first characteristic region of an $i^{th}$ image in the n images and a second characteristic region of an $(i+1)^{th}$ image in the n images by the processor, wherein $1 \leq i < n$, and a similarity between the first characteristic region and the second characteristic region is greater than a similarity threshold; determining a sub-trajectory of the light-emitting component corresponding to the $i^{th}$ image by the processor based on a position of the first characteristic region in the $i^{th}$ image and a position of the second characteristic region in the $(i+1)^{th}$ image; and determining the movement trajectory by the processor based on sub-trajectories corresponding to first n−1 images in the n images.

Optionally, the optical information further includes: information about at least one of a wavelength, a reflection angle, or a light intensity of the reflected light corresponding to a first image in the n images; and before determining the movement trajectory of the light-emitting component by the processor based on the optical information, the method further includes: correcting last n−1 images in the n images by the processor based on the information.

Optionally, acquiring the optical information about the reflected light of the probe light by the photosensitive component in response to receiving the reflected light includes: controlling the photosensitive component by the processor to acquire the optical information about the reflected light of the probe light in response to receiving the reflected light.

Optionally, the electronic device further includes: a light-emitting control component disposed in the body, wherein the light-emitting control component is connected to the light-emitting component; and emitting the probe light by the light-emitting component includes: emitting the probe light by the light-emitting component under control of the light-emitting control component.

Optionally, the electronic device further includes: a light intensity sensor disposed in the body; wherein the light intensity sensor is connected to the processor; the method further includes: detecting the light intensity of the reflected light by the light intensity sensor; and determining the movement trajectory of the light-emitting component by the processor based on the optical information includes: determining the movement trajectory by the processor in response to the light intensity being greater than a light intensity threshold.

Optionally, the electronic device further includes: a projection component disposed in the body, wherein the projection component is connected to the processor; and the method further includes: projecting the movement trajectory by the projection component.

Optionally, the electronic device further includes: a power detection component and a prompting component disposed in the body; and the method further includes: detecting remaining power of the power supply by the power detection component; and displaying prompt information by the prompting component in response to the remaining power being less than a power threshold.

Optionally, the power detection component and the prompting component are both connected to the processor; and displaying prompt information by the prompting component in response to the remaining power being less than a power threshold includes: displaying the prompt information by the prompting component under control of the processor in response to the remaining power being less than the power threshold.

Optionally, the electronic device further includes: a memory disposed in the body, wherein the memory is connected to the processor; and the method further includes: storing the movement trajectory in the memory.

Optionally, the electronic device further includes: a deletion component, wherein the deletion component is connected to the memory, and the method further includes: deleting the movement trajectory in the memory by the deletion component.

Optionally, the electronic device further includes: a transmission component, wherein the transmission component is connected to the memory, and the method further includes: transmitting the movement trajectory by the transmission component to other devices other than the electronic device.

According to a third aspect of embodiments of the present disclosure, a method for determining a movement trajectory, applicable to the processor in any electronic device as defined in the first aspect is provided. The method includes: acquiring optical information about reflected light, wherein the optical information is information acquired by a photosensitive component in response to receiving the reflected light of probe light emitted by light-emitting component; and determining a movement trajectory of the light-emitting component based on the optical information.

Optionally, the optical information includes: n images of the reflected light acquired in n times, and determining the movement trajectory of the light-emitting component based on the optical information includes: determining a first characteristic region of an $i^{th}$ image in the n images and a second characteristic region of an $(i+1)^{th}$ image in the n images, wherein $1 \leq i < n$, and a similarity between the first characteristic region and the second characteristic region is greater than a similarity threshold; determining a sub-trajectory of the light-emitting component corresponding to the $i^{th}$ image based on a position of the first characteristic region in the $i^{th}$ image and a position of the second characteristic region in the $(i+1)^{th}$ image; and determining the movement trajectory based on sub-trajectories corresponding to first n−1 images in the n images.

Optionally, the optical information further includes: information about at least one of a wavelength, a reflection angle, or a light intensity of the reflected light corresponding to a first image in the n images, and before determining the movement trajectory of the light-emitting component based on the optical information, the method further includes: correcting last n−1 images in the n images based on the information.

Optionally, the method further includes: controlling the photosensitive component to acquire the optical information about the reflected light of the probe light in response to receiving the reflected light.

Optionally, the electronic device further includes: a light intensity sensor disposed in the body, wherein the light intensity sensor is connected to the processor and configured to detect the light intensity of the reflected light; and determining the movement trajectory of the light-emitting component based on the optical information includes: determining the movement trajectory in response to the light intensity being greater than a light intensity threshold.

Optionally, the electronic device further includes: a power detection component and a prompting component disposed in the body, wherein the power detection component is configured to detect remaining power of a power supply; and the power detection component and the prompting component are both connected to the processor, and the method further includes: controlling the prompting component to display prompt information in response to the remaining power being less than a power threshold.

According to a fourth aspect of embodiments of the present disclosure, an apparatus for determining a movement trajectory, applicable to the processor in any electronic device as defined in the first aspect is provided. The apparatus includes: an acquiring module configured to acquire optical information about reflected light, wherein the optical information is information acquired by a photosensitive component in response to receiving the reflected light of probe light emitted by a light-emitting component; and a determining module configured to determine a movement trajectory of the light-emitting component based on the optical information.

Optionally, the optical information includes: n images of the reflected light acquired in n times; and the determining module is configured to: determine a first characteristic region of an $i^{th}$ image in the n images and a second characteristic region of an $(i+1)^{th}$ image in the n images, wherein $1 \leq i < n$, and a similarity between the first characteristic region and the second characteristic region is greater than a similarity threshold; determine a sub-trajectory of the light-emitting component corresponding to the $i^{th}$ image based on a position of the first characteristic region in the $i^{th}$ image and a position of the second characteristic region in the $(i+1)^{th}$ image; and determine the movement trajectory based on sub-trajectories corresponding to first n−1 images in the n images.

Optionally, the optical information further includes: information about at least one of a wavelength, a reflection angle, or a light intensity of the reflected light corresponding to a first image in the n images, and the apparatus for determining a movement trajectory further includes: a correcting module configured to correct last n−1 images in the n images based on the information.

Optionally, the apparatus further includes: a first controlling module configured to control the photosensitive component to acquire the optical information about the reflected light of the probe light in response to receiving the reflected light.

Optionally, the electronic device further includes: a light intensity sensor disposed in the body, wherein the light intensity sensor is connected to the processor and configured to detect the light intensity of the reflected light; and the determining module is configured to determine the movement trajectory in response to the light intensity being greater than a light intensity threshold.

Optionally, the electronic device further includes: a power detection component and a prompting component disposed in the body, wherein the power detection component is configured to detect remaining power of a power supply; the power detection component and the prompting component are both connected to the processor; and the apparatus further includes: a second controlling module configured to control the prompting component to display the prompt information in response to the remaining power being less than a power threshold.

According to a fifth aspect of embodiments of the present disclosure, a non-transitory computer-readable storage medium is provided. The non-transitory computer-readable storage medium stores a computer program, wherein the computer program, when running on a processor, causes the processor to perform the method for determining the movement trajectory as defined in the third aspect.

Reference signs in FIGS. 1 to 12 and denotations thereof:
1—body, 2—light-emitting component, 3—photosensitive component, 4—processor, 5—memory, 6—pressure sensor, 7—light intensity sensor, 8—projection component, 10—power supply, 11—deletion component, 12—transmission component, 13—optical lens, 14—switch, 15—charging interface, 16—save button, 31—wavelength acquiring component, 32—reflection angle acquiring component, 33—light intensity acquiring component, 34—imaging component, 011—barrel, 012—cap, 021—first port, 022—second port, 023—third port, 024—fourth port, 101—power detection component, 102—prompting component.

DETAILED DESCRIPTION

In order to further illustrate technical means employed in the present disclosure and effects thereof, specific implementation, structures, features, and effects of electronic devices according to the present disclosure are described in detail below with reference to accompanying drawings and embodiments.

A stylus in the related art is an electronic device that cooperates with a touch panel in use. Since the stylus may not be used alone, its use flexibility is low. Embodiments of the present disclosure provide an electronic device, which has high use flexibility since it needs no cooperation with other devices.

Figure 1:
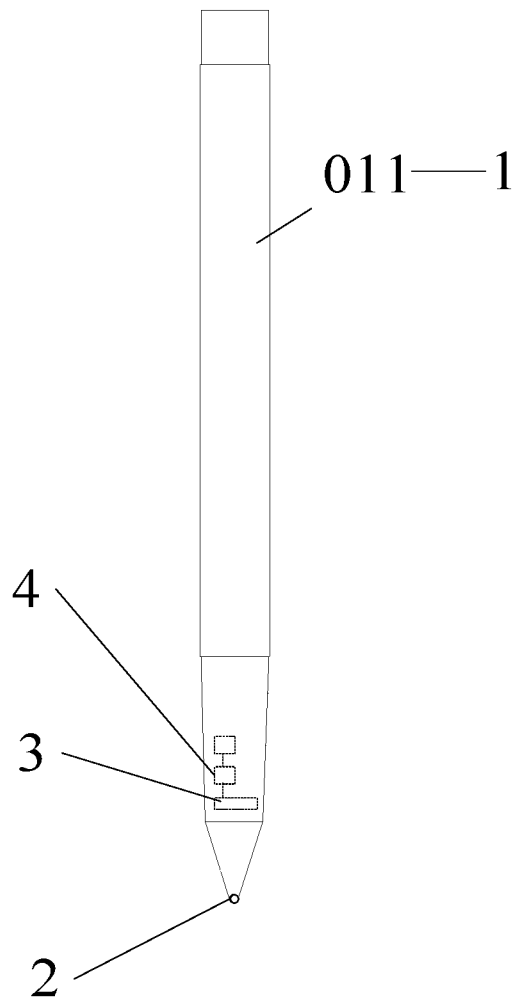
FIG. 1 is a schematic structural diagram of an electronic device according to an embodiment of the present disclosure.

For example, FIG. 1 is a schematic structural diagram of an electronic device according to an embodiment of the present disclosure. As shown in FIG. 1, the electronic device may include: a body 1, a light-emitting component 2, a photosensitive component 3, and a processor 4. The light-emitting component 2, the photosensitive component 3, and the processor 4 are all disposed in the body 1, and the photosensitive component 3 is connected to the processor 4. The light-emitting component 2 is configured to emit probe light; the photosensitive component 3 is configured to acquire optical information about the reflected light of the probe light in response to receiving the reflected light; and the processor 4 is configured to determine a movement trajectory of the light-emitting component 2 based on the optical information.

In summary, in the electronic device according to the embodiment of the present disclosure, the photosensitive component is capable of acquiring the optical information about the reflected light of the probe light emitted by the light-emitting component in response to receiving the reflected light, and the processor is capable of determining the movement trajectory of the light-emitting component based on the optical information acquired by the photosensitive component. In this way, the electronic device is capable of acquiring the movement trajectory of the light-emitting component by its own processor, and no other device is needed in the process of acquiring the movement trajectory by the electronic device, thereby improving the use flexibility of the electronic device.

The body of the electronic device according to the embodiment of the present disclosure may be in any suitable shape. In FIG. 1, the body 1 is in the shape of a pen as an example. The body 1 may also be in other shapes (such as a flashlight shape or a watch shape). The light-emitting component 2 in the electronic device may be disposed at any position of the body 1. For example, when the body 1 in the electronic device is in the shape of a pen, the body 1 includes a barrel 011, and the light-emitting component 2 may be disposed at a tip of the barrel 011. In this case, the electronic device is equivalent to a smart pen, and a movement trajectory of the light-emitting component 2 in the electronic device is equivalent to a writing trajectory of the smart pen.

In the process of acquiring the movement trajectory by the electronic device, the light-emitting component 2 may also serve for lighting, thereby avoiding a case where the processor 4 fails to acquire the movement trajectory of the light-emitting component 2 due to insufficient luminance.

When using the electronic device, a user may hold the body 1 and drive the body 1 to move, to drive the light-emitting component 2 on the body 1 to move. In this case, an irradiation area of the probe light emitted by the light-emitting component 2 also moves, the optical information acquired by the photosensitive component 3 varies, and the processor 4 is capable of determining the movement trajectory of the light-emitting component 2 based on the varied optical information.

Optionally, the optical information acquired by the photosensitive component 3 includes: n images of the reflected light acquired in n times, $n \geq 2$. That is, the photosensitive component 3 may continuously acquire images of the reflected light for n times so as to acquire the n images. Optionally, a time interval for the photosensitive component 3 to acquire images of the reflected light between every two adjacent times may be a fixed interval. The time interval may not be a fixed interval, which is not limited in the embodiment of the present disclosure.

When the optical information includes the n images, the processor 4 is capable of determining the movement trajectory of the light-emitting component 2 based on the n images. In this case, the processor 4 may be configured to: firstly determine a first characteristic region of an $i^{th}$ image in the n images and a second characteristic region of an $(i+1)^{th}$ image in the n images; then determine a sub-trajectory of the light-emitting component corresponding to the $i^{th}$ image based on a position of the first characteristic region in the $i^{th}$ image and a position of the second characteristic region in the $(i+1)^{th}$ image; and lastly determine the movement trajectory based on sub-trajectories corresponding to first n−1 images in then images, wherein $1 \leq i < n$, and a similarity between the first characteristic region and the second characteristic region is greater than a similarity threshold. The similarity threshold may be any value, such as 90% or 100%.

Figure 2:
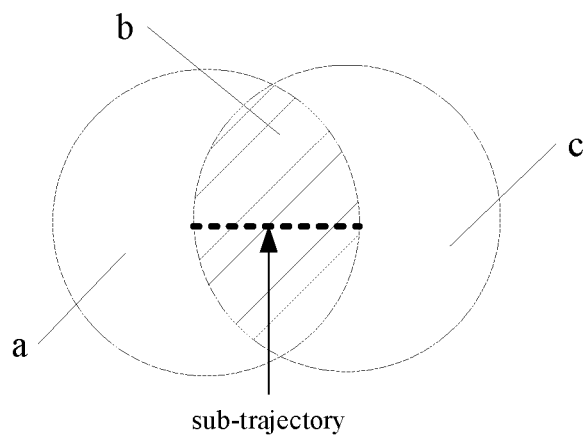
FIG. 2 is a schematic diagram of an image acquired by a photosensitive component according to an embodiment of the present disclosure.

For example, when using the electronic device, a user may hold the electronic device and drive the electronic device to move, so as to drive the light-emitting component to move. Assuming that in this process, the $i^{th}$ image in the n images acquired by the photosensitive component includes a circular image composed of region a and region b in FIG. 2, and the $(i+1)^{th}$ image in the n images includes a circular image composed of region b and region c in FIG. 2, then the processor may compare the $i^{th}$ image with the $(i+1)^{th}$ image and determine that two characteristic regions with a similarity greater than a threshold in the two images are the first characteristic region in the $i^{th}$ image (e.g. region b in FIG. 2) and the second characteristic region in the $(i+1)^{th}$ image (e.g., region b in FIG. 2). As shown in FIG. 2, a position of the first characteristic region in the $i^{th}$ image is a right position, and a position of the second characteristic region in the $(i+1)^{th}$ image is a left position. By comparing these two positions, the processor is capable of determining that the light-emitting component moves from left to right in a process of acquiring these two images by the photosensitive component, and then may acquire a sub-trajectory (i.e., a sub-trajectory corresponding to the $i^{th}$ image) of the light-emitting component in the process of acquiring these two images by the photosensitive component. The sub-trajectory may be a trajectory from the center of an illumination area (an irradiation area of the probe light) corresponding to the $i^{th}$ image to the center of an illumination area corresponding to the $(i+1)^{th}$ image.

Figure 3:
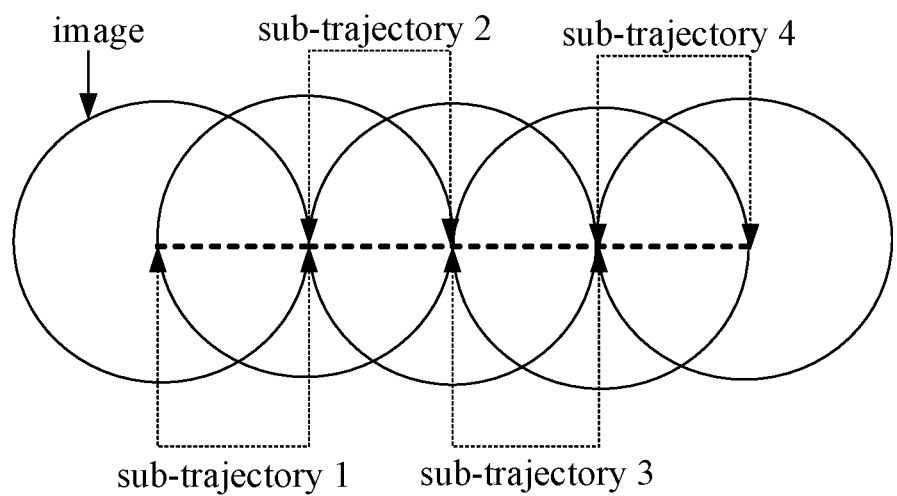
FIG. 3 is a schematic diagram of another image acquired by a photosensitive component according to an embodiment of the present disclosure.

After acquiring sub-trajectories corresponding to first n−1 images in the n images, the processor may stitch sub-trajectories corresponding to the first n−1 images so as to acquire the movement trajectory the light-emitting component in a process of acquiring the n images by the photosensitive component. For example, assuming that n images acquired by the photosensitive component are five circular images as shown in FIG. 3, the processor may sequentially stitch four sub-trajectories corresponding to the first four images (e.g., sub-trajectories 1, 2, 3, and 4 in FIG. 3) in the five images in response to acquiring the four sub-trajectories, so as to acquire a movement trajectory of the light-emitting component composed of sub-trajectories 1, 2, 3, and 4.

Further, the optical information may include not only the n images, but also information about at least one of a wavelength, a reflection angle, or a light intensity of the reflected light corresponding to a first image in the n images (that is, the information about the reflected light when the photosensitive component acquires the first image). In this case, before determining the movement trajectory of the light-emitting component 2 based on the n images, the processor may correct last n−1 images in the n images based on the information, such that the information corresponding to the last n−1 image is relatively similar to the information corresponding to the first image, thereby avoiding a relatively large deviation of the information corresponding to the last n−1 images with respect to the information corresponding to the first image due to influence of an external environment, and avoiding the last n−1 images being affected by the external environment and being less accurate.

Figure 4:
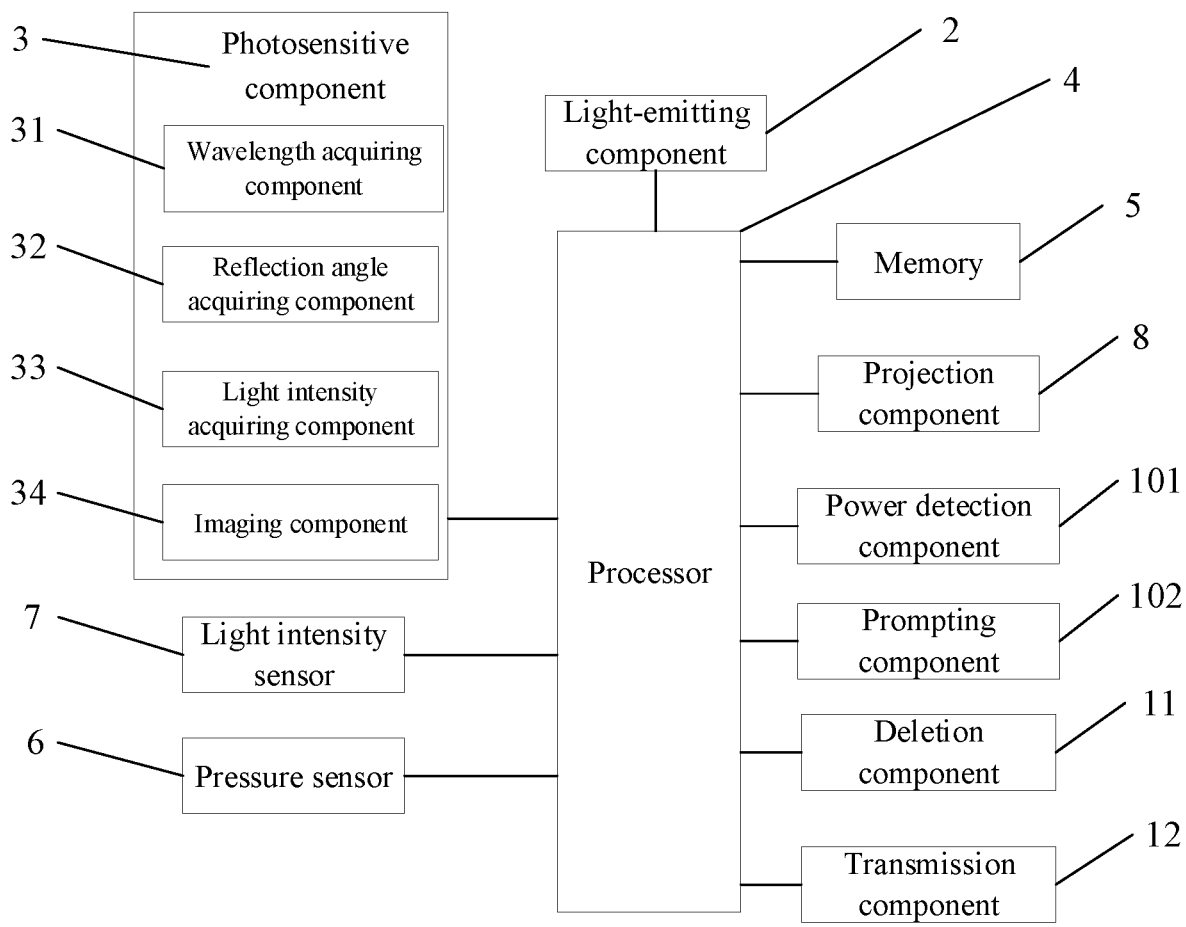
FIG. 4 is a structural block diagram of an electronic device according to an embodiment of the present disclosure.

Optionally, FIG. 4 is a structural block diagram of an electronic device according to an embodiment of the present disclosure. As shown in FIG. 4, when the optical information includes the images of the reflected light, the photosensitive component 3 includes: an imaging component 34 (such as a micro imager) configured to acquire images of the reflected light. When the optical information includes the wavelength of the reflected light corresponding to the first image, the photosensitive component 3 includes a wavelength acquiring component 31 configured to acquire the wavelength of the reflected light; when the optical information includes the reflection angle of the reflected light corresponding to the first image, the photosensitive component 3 includes a reflection angle acquiring component 32 configured to acquire the reflection angle of the reflected light; and when the optical information includes the light intensity of the reflected light corresponding to the first image, the photosensitive component 3 includes a light intensity acquiring component 33 configured to acquire the light intensity of the reflected light. The imaging component 34, the wavelength acquiring component 31, the reflection angle acquiring component 32, and the light intensity acquiring component 33 are all connected to the processor 4.

Optionally, as shown in FIG. 4, the electronic device may further include: a memory 5 disposed in the body (not shown in FIG. 1). The memory 5 is connected to the processor 4 and configured to store the movement trajectory acquired by the processor 4. Since the memory 5 is capable of recording the movement trajectory acquired by the processor 4, an effect that the electronic device records the movement trajectory of the light-emitting component 2 is achieved. For example, the processor 4 may convert the acquired movement trajectory into a picture which may be stored in the memory 5. For another example, the processor 4 may also convert the acquired movement trajectory into a document which may be stored in the memory 5.

Optionally, the electronic device may further include a save button 16 (referring to FIG. 5) disposed on the body, and the user may trigger the memory 5 to store the movement trajectory by pressing the save button 16. The body may also be provided with an indicator (not shown in FIG. 4), wherein the indicator may flash after the memory 5 successfully stores the movement trajectory to remind the user that the movement trajectory was successfully saved.

In the embodiment of the present disclosure, the light-emitting component 2 may be any component capable of emitting light, such as a component for emitting laser light, infrared light, and the like. The processor 4 may be any type of processor, such as a digital signal processor (DSP). The memory 5 may be any type of memory, such as a secure digital memory card (SD card).

Optionally, the photosensitive component 3 may voluntarily acquire the optical information. An operation of acquiring the optical information may also be an operation under control of the processor 4. In this case, the processor 4 is further configured to control the photosensitive component 3 to acquire the optical information.

Figure 5:
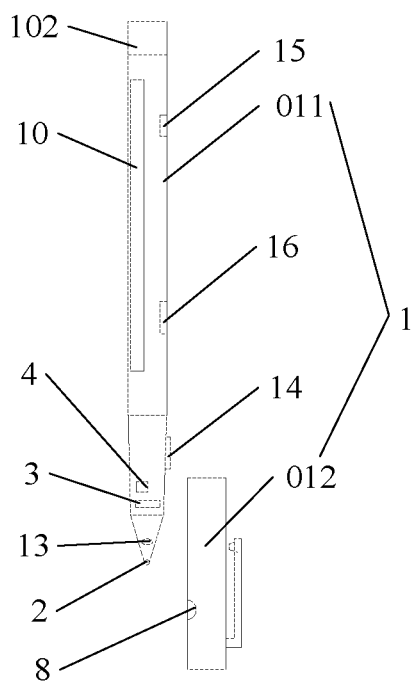
FIG. 5 is a schematic structural diagram of another electronic device according to an embodiment of the present disclosure.

Optionally, the electronic device may further include: a light-emitting control component disposed in the body. The light-emitting control component may be connected to the light-emitting component 2 (either directly or indirectly) and configured to control the light-emitting component 2 to emit the probe light. The user may control the light-emitting component 2 to emit probe light by controlling the light-emitting control component. For example, referring to FIG. 4 again, the light-emitting control component may include: a pressure sensor 6 disposed in a pressure sensing region on the body 1. The pressure sensor 6 is configured to control the light-emitting component 2 to emit the probe light in response to the pressure on the pressure sensing region being greater than a pressure threshold. FIG. 5 is a schematic structural diagram of another electronic device according to an embodiment of the present disclosure. As shown in FIG. 5, in order to visually observe the position of the pressure sensor, a depressible switch 14, in which the pressure sensor is provided (not shown in FIG. 5), may be provided in the pressure sensing region on the body 1. The switch 14 protrudes from a surface of the body 1 for facilitating the user to press the switch 14. When the user presses the switch 14, the pressure sensor may detect the pressure on the pressure sensing region.

The body in the electronic device according to the embodiment of the present disclosure may include a barrel, and the user may use the electronic device just like holding a pen. When the user is holding the barrel, a region on the body touched by the user's hand may be the aforementioned pressure sensing region. For example, once a character is written, the user lifts the pen to write the next character. When the user lifts the pen, the user's grip strength changes and a pressure on the pen decreases. In this case, a pressure detected by the pressure sensor disposed in the pressure sensing region becomes smaller. When the pressure detected by the pressure sensor is less than the pressure threshold, the light-emitting component is controlled to stop emitting the probe light, so as to ensure that the processor does not generate a movement trajectory and the memory does not record the movement trajectory accordingly during a time period, in which the tip of the pen is lifted, between writing one character and writing another character by the user.

It is defined that each time a pressure detected by the pressure sensor is greater than the pressure threshold, the movement trajectory recorded in the memory is a section of trajectory. Trajectories of different sections are stored in different positions in the memory, so as to avoid confusion of the recorded movement trajectories due to repetition of trajectories of different sections. In this case, the pressure sensor may serve as a switch for activating a recording function. When using the electronic device, the user may hold the body of the electronic device. In this case, a pressure detected by the pressure sensor is greater than the pressure threshold, thus the light-emitting component, the photosensitive component, the processor, and the memory all start to work, and the memory starts to record the movement trajectory of the light-emitting component determined by the processor during this time period. After writing with the electronic device, the user may release the body of the electronic device. In this case, a pressure detected by the pressure sensor is less than the pressure threshold, thus the memory may stop recording the movement trajectory of this section. The electronic device may further be provided with a data connection port, by which the movement trajectory recorded in the memory may be transmitted to other devices.

In the embodiment of the present disclosure, the light-emitting control component including a pressure sensor is taken as an example. Optionally, the light-emitting control component may further include a start switch (not shown in drawings) disposed on the body 1. The start switch is connected to the light-emitting component 2, and conditions for emitting light by the light-emitting component 2 include: the start switch is turned on.

In the embodiment of the present disclosure, the light-emitting control component may directly control the light-emitting component to emit light as an example. Optionally, the light-emitting control component may also control the light-emitting component to emit light by a processor. For example, when a pressure detected by the pressure sensor is greater than the pressure threshold, the processor may control the light-emitting component to emit light, which is not limited in the embodiment of the present disclosure.

Optionally, the processor 4 may also determine the movement trajectory under control of the light-emitting control component. For example, when a pressure detected by the pressure sensor is less than the pressure threshold, the processor 4 does not determine the movement trajectory of the light-emitting component 2. In this case, even if the light-emitting component 2 may emit the probe light and the photosensitive component may acquire the optical information about the reflected light, the processor 4 does not determine the aforementioned movement trajectory.

Optionally, as shown in FIG. 4, the electronic device further includes: a light intensity sensor 7 disposed in the body, wherein the light intensity sensor 7 is connected to the processor 4 and configured to detect the light intensity of the reflected light. The processor 4 is configured to determine the movement trajectory of the light-emitting component 2 in response to the light intensity detected by the light intensity sensor 7 being greater than a light intensity threshold. For example, when the light-emitting component 2 is placed on a writing surface (such as a desktop, a paper surface, or a surface of a human thigh), the light intensity detected by the light intensity sensor 7 is relatively high; when the light-emitting component 2 is suspended in the air, the light intensity detected by the light intensity sensor 7 is relatively weak since a distance between a reflection surface and the light intensity sensor 7 is relatively long. Therefore, it is possible to determine whether the light-emitting component 2 is placed on the writing surface by detecting the light intensity of the reflected light, and the processor 4 is capable of determining the movement trajectory only when the light-emitting component 2 is placed on the writing surface for writing. When the user uses the electronic device to write on the writing surface and switches to next line or next character, the user lifts his/her hand such that the light intensity of the reflected light detected by the light intensity sensor 7 is less than the light intensity threshold. Therefore, the processor does not determine the movement trajectory of the light-emitting component in this process, and accordingly the memory does not record the movement trajectory.

Optionally, referring to FIG. 4 again, the electronic device further includes: a projection component 8. The projection component 8 is connected to the processor 4 and configured to project the movement trajectory of the light-emitting component 2. When the user uses the electronic device for writing, the projection component 8 in the electronic device may project the movement trajectory of the light-emitting component 2 in real time. Therefore, it is convenient for the user to observe their own writing, and if there is an error, it may be corrected in time or it may be written again.

Optionally, the operation of projecting of the movement trajectory by the projection component 8 may be a voluntary operation or an operation performed under control of the processor 4. In a case where the projection component 8 performs the projection of the movement trajectory under the control of the processor 4, a projection button may be provided on the body. In this way, when the projection button is pressed, the processor 4 may receive a projection instruction and then may control the projection component 8 to perform projecting.

Optionally, in the case that the processor 4 controls the projection component 8 to project the movement trajectory, the processor 4 may control the projection component 8 to project a section of movement trajectory each time the user completes writing the section of movement trajectory (the processor determines the section of movement trajectory); alternatively, the processor 4 may control the projection component 8 to project the movement trajectory in real time. For example, when the user wants to record sections A, B, C . . . , and G, wherein each letter represents a section of movement trajectory, multiple projection methods may be employed. Herein three projection methods are briefly introduced. In a first method, the projection is performed while the user is writing, that is, real-time projection of the movement trajectory is performed, and the user may observe their writing at any time. In a second method, for example, sections A to F written previously may be all projected when the user is writing the section G, and the section G is projected after the section G is written, that is, the section G is not projected during a process of writing the section G. In a third method, only the section G is projected after the section G is written by the user, and sections A to F are not projected.

Optionally, after the memory successfully stores the movement trajectory, the projection component 8 may perform projecting for a predetermined duration to remind the user that the movement trajectory is stored successfully, and the user may further check his/her writing by the projection in the meantime.

Figure 6:
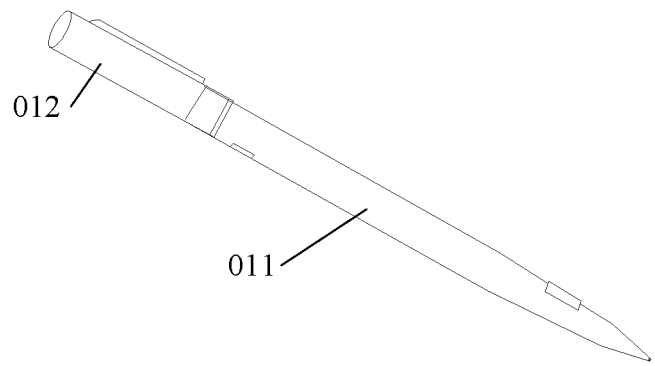
FIG. 6 is a schematic state diagram of an electronic device in use according to an embodiment of the present disclosure.
Figure 7:
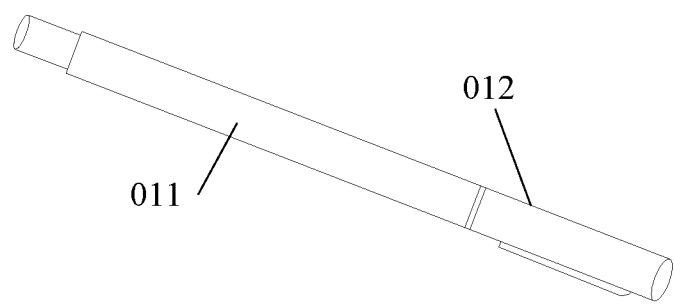
FIG. 7 is a schematic state diagram of an electronic device not in use according to an embodiment of the present disclosure.

FIG. 5 is a schematic diagram of the appearance of another electronic device according to an embodiment of the present disclosure. Referring to FIG. 5, the body 1 may include: a barrel 011 and a cap 012, wherein the cap 012 is detachably connected to an end of the barrel 011 (the end where the light-emitting component 2 is disposed in FIG. 5) provided with a tip, such that the cap 012 may protect the light-emitting component 2 at the tip to prevent the light-emitting component 2 from being damaged. When the user uses the electronic device, as shown in FIG. 6, the cap 012 may also be mounted on an end of the barrel 011 opposing to the end of the tip of the barrel 011, thereby avoiding the loss of the cap 012. When the electronic device is not in use, as shown in FIG. 7, the cap 012 may be mounted on the end of the barrel 011 where the tip is disposed. The projection component 8 may be disposed in the cap 012. The processor 4, the light-emitting component 2, the photosensitive component 3, the memory (not shown in FIG. 5), the light-emitting control component (not shown in FIG. 5), and the light intensity sensor (not shown in FIG. 5) may all be disposed in the barrel 011. When the user uses the electronic device for writing, the user may hold the barrel 011 and place the cap 012 aside, such that a picture projected by the projection component 8 is projected on a certain plane, and the user may write while watching his/her writing results.

Optionally, a receiver (not shown in drawings) may be provided on the cap 012 for receiving the movement trajectory. At the same time, a transmitter (not shown in drawings) is further provided on the barrel 011. The transmitter is connected to the processor 4, and the receiver is connected to the projection component 8. The processor 4 may control the transmitter to transmit the movement trajectory to the receiver, and the receiver may transmit the received movement trajectory to the projection component 8, such that the projection component 8 may project the movement trajectory.

Optionally, referring to FIG. 5, the electronic device further includes: a power supply 10 configured to supply power to at least part of electrical components in the electronic device. The electrical components in the electronic device may include: components that require electricity in the electronic device other than the power supply 10, such as the processor 4, the light-emitting component 2, and the projection component 8. The power supply 10 in the electronic device may supply power to all electrical components or only part of electrical components in the electronic device, which is not limited in the embodiment of the present disclosure.

Optionally, the power supply 10 is configured to supply power to at least part of the electrical components when the cap 012 is mounted on an end of the barrel 011 opposing to the end of the tip of the barrel 011 (as shown in FIG. 6). It can be seen that only when the cap 012 is mounted on the end of the barrel 011 opposing to the end of the tip of the barrel 011, the power supply may supply power to the at least part of electrical components and the entire electronic device may operate normally, thereby avoiding the loss of the cap 012.

Figure 8:
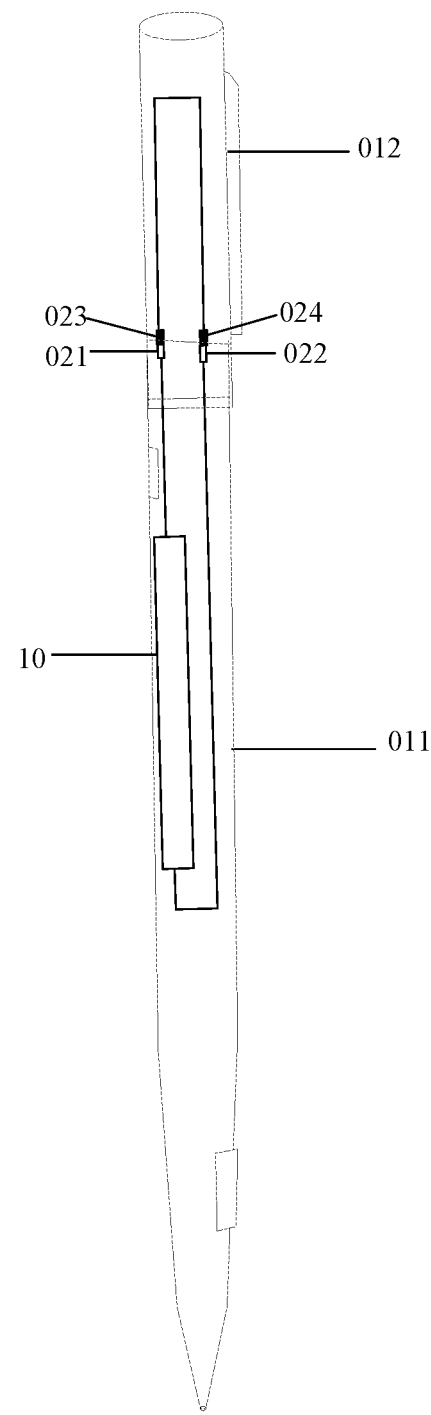
FIG. 8 is a schematic diagram of power supply of a power supply according to an embodiment of the present disclosure.

For example, FIG. 8 is a schematic diagram of power supply of a power supply according to an embodiment of the present disclosure. As shown in FIG. 8, the electronic device further includes: a first port 021, a second port 022, a third port 023 and a fourth port 024, wherein these ports are also called interfaces. The first port 021, the power supply 10, and the second port 022 may all be disposed in the barrel 011, and the first port 021, the power supply 10, and the second port 022 are connected in series; and the third port 023 and the fourth port 024 are both disposed in the cap 012, and the third port 023 is connected to the fourth port 024. When the cap 012 is mounted on the end of the barrel 011 opposing to the end of the tip of the barrel 011, the first port 021 is connected to the third port 023, the second port 022 is connected to the fourth port 024, and the first port 021, the power supply 10, the second port 022, the fourth port 024, and the third port 023 form a power supply circuit. The at least part of electrical components (not shown in FIG. 8) to which the power supply 10 supplies power may be connected in series in the power supply circuit. The first port 021 and the third port 023 may be powered by touching, and the second port 022 and the fourth port 024 may also be powered by touching. The first port 021, the second port 022, the third port 023, and the fourth port 024 may all be ceramic power interfaces.

In an exemplary embodiment, the at least part of electrical components to which the power supply 10 supplies power may include the projection component disposed in a cap. The projection component may be connected in series between the third port 023 and the fourth port 024, such that the projection component is connected in a power supply circuit when the first port 021, the power supply 10, the second port 022, the fourth port 024, and the third port 023 form the power supply circuit, thus it is convenient for the projection component to be powered by the power supply 10 and to perform projecting. It can be seen that, the first port 021, the second port 022, the third port 023, and the fourth port 024 are switches for an electrical connection between the power supply and the projection component. In addition, these ports may also be switches for data transmission, that is, only when the first port is electrically connected to the third port while the second port is electrically connected to the fourth port, the movement trajectory may be transmitted between the projection component and the processor, so as to project the movement trajectory by the projection component.

The power supply 10 may be a lithium battery. Referring to FIG. 5, the body 1 (such as the barrel 011 of the body 1) may be provided with a charging interface 15. The charging interface 15 is connected to the power supply 10, such that the power supply 10 may be charged by the charging interface 15, and the electronic device may be sustainably used.

Optionally, in the embodiment of the present disclosure, the power supply 10 may be an independent power supply as an example. Optionally, the power supply 10 may include a first power supply disposed in the barrel and a second power supply disposed in the cap. The first power supply is configured to supply power to at least part of electrical components in the barrel (such as the processor), and the second power supply is configured to supply power to at least part of electrical components in the cap (such as the projection component).

Optionally, referring to FIG. 4 again, the electronic device further includes: a power detection component 101 and a prompting component 102 disposed in the body (such as the barrel of the body). The power detection component 101 is configured to detect remaining power of the power supply 10, and the prompting component 102 is configured to display prompt information in response to the remaining power detected by the power detection component 101 being less than a power threshold. The prompting component may be a prompting lamp (such as a light-emitting diode), or a voice prompt device, examples of the prompting component are not listed here exhaustively. When the remaining power of the power supply 10 is low, the prompting component 102 may prompt the user to charge the power supply 10, so as to avoid a case where the electronic device fails to operate due to untimely charging of the power supply.

Optionally, the operation of displaying the prompt information by the prompting component 102 may be a voluntary operation or an operation performed under control of the processor 4. When the prompting component 102 displays the prompt information under the control of the processor 4, the power detection component 101 and the prompting component 102 are both connected to the processor 4, and the processor 4 is configured to control the prompting component 102 to display prompt information in response to the remaining power detected by the power detection component 101 being less than the power threshold. Optionally, as shown in FIG. 5, the prompting component 102 may be disposed on an end of the barrel 011 away from the tip.

Optionally, referring to FIG. 4 again, the electronic device further includes: a deletion component 11. The deletion component 11 is connected to the memory 5 and configured to delete a movement trajectory in the memory 5. When the user uses the electronic device, writing errors are inevitable and a wrong movement trajectory may be stored in the memory 5. In this case, the user may delete the wrong movement trajectory by the deletion component 11. For example, if the user wants to record A, B, C . . . , and G in sequence, but a writing error in the section B is found, the user may delete the section B by the deletion component, then the movement trajectory stored in the memory 5 becomes: A, C, D . . . , and G.

Optionally, the electronic device may further include: a deletion switch, and the deletion component may be triggered to delete a movement trajectory stored in the memory by pressing the deletion switch by the user. Optionally, the switch 14 in FIG. 5 may be reused as the deletion switch. When the user presses the switch 14 twice in succession, the deletion component may be triggered by the switch 14 to delete the movement trajectory stored in the memory. The deletion switch may be different from the switch 14 in FIG. 5, which is not limited in the embodiment of the present disclosure.

Optionally, the operation of deleting the movement trajectory in the memory 5 by the deletion component 11 may be a voluntary operation or an operation performed under control of the processor 4. When the deletion component 11 deletes the movement trajectory in the memory 5 under the control of the processor 4, the deletion component 11 and the deletion switch are both connected to the processor 4. When the user presses the deletion switch, the processor 4 receives a deletion instruction and control the deletion component 11 to delete a corresponding movement trajectory in the memory 5 according to the deletion instruction.

Optionally, still referring to FIG. 4, the electronic device further includes: a transmission component 12. The transmission component may be a wireless transmission component or a wired transmission component, which is not limited in the embodiment of the present disclosure. The transmission component 12 is connected to the memory 5 and configured to transmit the movement trajectory in the memory 5 to other devices (such as a server or a computer) except the electronic device. By providing the transmission component 12, the movement trajectory stored in the memory 5 may be transmitted to other devices for storage. When the memory 5 stores the movement trajectory in the form of a picture, the transmission component 12 may transmit the picture of the movement trajectory to another device, such that the device recognizes the movement trajectory in the picture by image recognition software.

Optionally, as shown in FIG. 5, the electronic device further includes: an optical lens 13 disposed in the body 1. After emitting probe light by the light-emitting component 2, reflected light of the probe light passes through the optical lens 13 and arrives at the photosensitive component 3, and the photosensitive component 3 is configured to receive the reflected light passing through the optical lens 13. Optionally, the optical lens 13 may be a convex lens, such that the optical lens 13 may amplify the reflected light, and the intensity of the reflected light is made greater, which is conducive to acquiring more accurate optical information by the photosensitive component 3, and convenient for the processor 4 to determine an accurate movement trajectory based on the optical information.

In summary, in the electronic device according to the embodiment of the present disclosure, the photosensitive component is capable of acquiring the optical information about the reflected light of the probe light emitted by the light-emitting component in response to receiving the reflected light, and the processor is capable of determining the movement trajectory of the light-emitting component based on the optical information acquired by the photosensitive component. In this way, the electronic device is capable of acquiring the movement trajectory of the light-emitting component by its own processor, and no other device is needed in the process of acquiring the movement trajectory by the electronic device, thereby improving the use flexibility of the electronic device.

Figure 9:
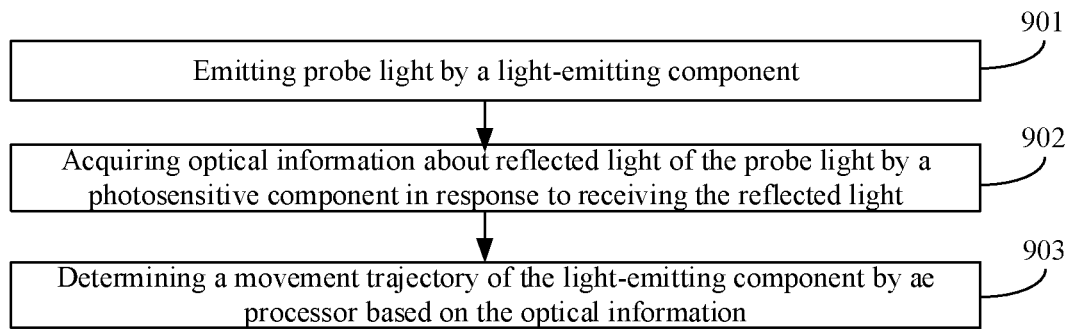
FIG. 9 is a flowchart of a method for determining a movement trajectory according to an embodiment of the present disclosure.

Based on the electronic device according to the embodiments of the present disclosure, an embodiment of the present disclosure provides a method for determining a movement trajectory, applicable to any electronic device according to embodiments of the present disclosure. For example, FIG. 9 is a flowchart of a method for determining a movement trajectory according to an embodiment of the present disclosure. As shown in FIG. 9, the method includes the following steps.

In step 901, probe light is emitted by a light-emitting component.

In step 902, optical information about reflected light of the probe light is acquired by a photosensitive component in response to receiving the reflected light.

In step 903, a movement trajectory of the light-emitting component is determined by a processor based on the optical information.

In summary, in the method for determining a movement trajectory according to the embodiment of the present disclosure, the photosensitive component is capable of acquiring the optical information about the reflected light of the probe light emitted by the light-emitting component in response to receiving the reflected light, and the processor is capable of determining the movement trajectory of the light-emitting component based on the optical information acquired by the photosensitive component. In this way, the electronic device is capable of acquiring the movement trajectory of the light-emitting component by the processor thereof, and no other device is needed in the process of acquiring the movement trajectory by the electronic device, thereby improving the use flexibility of the electronic device.

Figure 10:
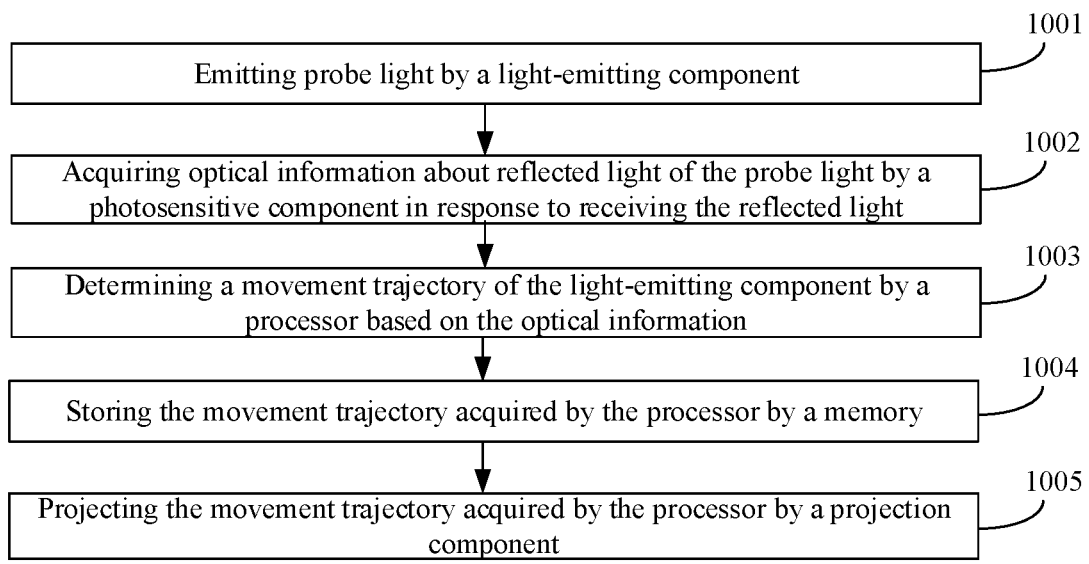
FIG. 10 is a flowchart of another method for determining a movement trajectory according to an embodiment of the present disclosure.

For example, FIG. 10 is a flowchart of another method for determining a movement trajectory according to an embodiment of the present disclosure, applicable to any electronic device according to embodiments of the present disclosure. As shown in FIG. 10, the method includes the following steps:

In step 1001, probe light is emitted by a light-emitting component.

Optionally, the electronic device further includes: a light-emitting control component disposed in the body. The light-emitting control component is connected to the light-emitting component, and the light-emitting component may emit the probe light under control of the light-emitting control component. The operation of emitting the probe light by the light-emitting component may also be a voluntary operation, which is not limited in the embodiment of the present disclosure.

In step 1002, optical information about reflected light of the probe light is acquired by a photosensitive component in response to receiving the reflected light.

Optionally, the photosensitive component may acquire the optical information about the reflected light of the probe light in response to receiving the reflected light under control of a processor. The operation of acquiring the optical information by the photosensitive component may also be a voluntary operation, which is not limited in the embodiment of the present disclosure.

In step 1003, a movement trajectory of the light-emitting component is determined by the processor based on the optical information.

Optionally, the optical information includes: n images of the reflected light acquired in n times, and the step 1003 may include: determining a first characteristic region of an $i^{th}$ image in then images and a second characteristic region of an $(i+1)^{th}$ image in then images by the processor, wherein $1 \leq i < n$, and a similarity between the first characteristic region and the second characteristic region is greater than a similarity threshold; determining a sub-trajectory of the light-emitting component corresponding to the $i^{th}$ image by the processor based on a position of the first characteristic region in the $i^{th}$ image and a position of the second characteristic region in the $(i+1)^{th}$ image; and determining the movement trajectory by the processor based on sub-trajectories corresponding to first n−1 images in the n images.

Optionally, the optical information further includes: information about at least one of a wavelength, a reflection angle, or a light intensity of the reflected light corresponding to a first image in the n images; and before the step 1003, last n−1 images in the n images are corrected by the processor based on the information.

Optionally, the electronic device further includes: a light intensity sensor disposed in the body. The light intensity sensor is connected to the processor and may detect the light intensity of the reflected light. The processor is capable of determining the movement trajectory only when the light intensity is higher than a light intensity threshold.

In step 1004, the movement trajectory acquired by the processor is stored by a memory.

In step 1005, the movement trajectory acquired by the processor is projected by a projection component.

Optionally, the electronic device further includes: a power detection component and a prompting component disposed in the body; and in this case, the method may further include: detecting remaining power of the power supply by the power detection component; and displaying prompt information by the prompting component in response to the remaining power being less than a power threshold. Optionally, the power detection component and the prompting component are both connected to the processor, and the prompting component may display the prompt information in response to the remaining power being less than the power threshold under control of the processor.

Optionally, the electronic device further includes: a deletion component. The deletion component is connected to the memory. In this case, the method may further include: deleting the movement trajectory in the memory by the deletion component.

Optionally, the electronic device further includes: a transmission component. The transmission component is connected to the memory. In this case, the method further includes: transmitting the movement trajectory by the transmission component to other devices except the electronic device.

For the explanation of each step in the embodiment of the method for determining the movement trajectory according to embodiments of the present disclosure, reference may be made to relevant contents in the embodiment of the electronic device according to embodiments of the present disclosure, which is not repeated herein.

In summary, in the method for determining the movement trajectory according to the embodiment of the present disclosure, the photosensitive component is capable of acquiring the optical information about the reflected light of the probe light emitted by the light-emitting component in response to receiving the reflected light, and the processor is capable of determining the movement trajectory of the light-emitting component based on the optical information acquired by the photosensitive component. In this way, the electronic device is capable of acquiring the movement trajectory of the light-emitting component by the processor thereof, and no other device is needed in the process of acquiring the movement trajectory by the electronic device, thereby improving the use flexibility of the electronic device.

Figure 11:
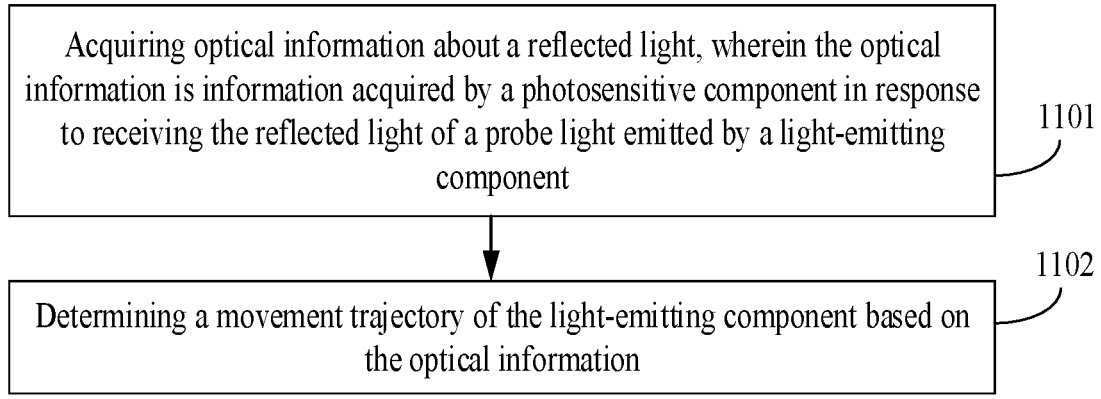
FIG. 11 is a flowchart of yet another method for determining a movement trajectory according to an embodiment of the present disclosure.

Based on the electronic device according to embodiments of the present disclosure, embodiments of the present disclosure provide a method for determining a movement trajectory, applicable to the processor in any electronic device according to embodiments of the present disclosure. For example, FIG. 11 is a flowchart of another method for determining a movement trajectory according to an embodiment of the present disclosure. As shown in FIG. 11, the method includes:

In step 1101, optical information about reflected light, wherein the optical information is information acquired by a photosensitive component in response to receiving the reflected light of probe light emitted by a light-emitting component;

In step 1102, a movement trajectory of the light-emitting component is determined based on the optical information.

Optionally, the optical information includes n images of the reflected light acquired in n times, and the step 1102 includes:

determining a first characteristic region of an $i^{th}$ image in the n images and a second characteristic region of an $(i+1)^{th}$ image in the n images, wherein $1 \leq i < n$, and a similarity between the first characteristic region and the second characteristic region is greater than a similarity threshold;

determining a sub-trajectory of the light-emitting component corresponding to the $i^{th}$ image based on a position of the first characteristic region in the $i^{th}$ image and a position of the second characteristic region in the $(i+1)^{th}$ image; and determining the movement trajectory based on sub-trajectories corresponding to first n−1 images in the n images.

Optionally, the optical information further includes: information about at least one of a wavelength, a reflection angle, or a light intensity of the reflected light corresponding to a first image in the n images; and before the step 1102, the method further includes: correcting last n−1 of the n images based on the information.

Optionally, before the step 1101, the method further includes: controlling the photosensitive component to acquire the optical information about the reflected light of the probe light in response to receiving the reflected light.

Optionally, the electronic device further includes: a light intensity sensor disposed in the body. The light intensity sensor is connected to the processor and configured to detect the light intensity of the reflected light; and the step 1102 includes: determining the movement trajectory in response to the light intensity being greater than a light intensity threshold.

Optionally, the electronic device further includes: a power detection component and a prompting component disposed in the body. The power detection component is configured to detect remaining power of the power supply; both the power detection component and the prompting component are connected to the processor, and the method further includes: controlling the prompting component to display prompt information in response to the remaining power being less than a power threshold.

In summary, in the method for determining the movement trajectory according to the embodiment of the present disclosure, the photosensitive component is capable of acquiring the optical information about the reflected light of the probe light emitted by the light-emitting component in response to receiving the reflected light, and the processor is capable of determining the movement trajectory of the light-emitting component based on the optical information acquired by the photosensitive component. In this way, the electronic device is capable of acquiring the movement trajectory of the light-emitting component by the processor thereof, and no other device is needed in the process of acquiring the movement trajectory by the electronic device, thereby improving the use flexibility of the electronic device.

Based on the method for determining the movement trajectory according to the embodiment of the present disclosure, embodiments of the present disclosure provide an apparatus for determining a movement trajectory, applicable to the processor in any electronic device according to embodiments of the present disclosure. For example, FIG. 12 is a schematic structural diagram of an apparatus for determining a movement trajectory according to an embodiment of the present disclosure.

Figure 12:
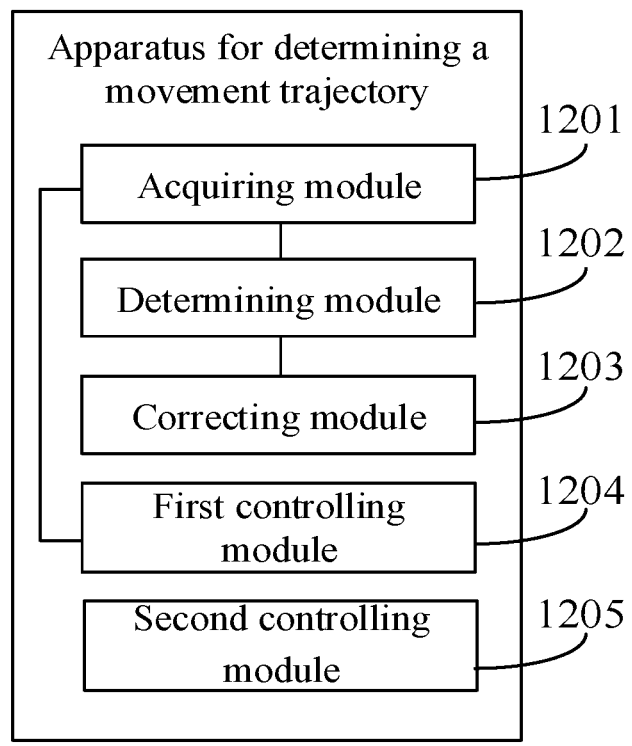
FIG. 12 is a schematic structural diagram of an apparatus for determining a movement trajectory according to an embodiment of the present disclosure.

As shown in FIG. 12, the apparatus for determining a movement trajectory includes: an acquiring module 1201 configured to acquire optical information about reflected light, wherein the optical information is information acquired by a photosensitive component in response to receiving the reflected light of probe light emitted by a light-emitting component; and a determining module 1202 configured to determine a movement trajectory of the light-emitting component based on the optical information.

Optionally, the optical information includes: n images of the reflected light acquired in n times; and the determining module 1202 is configured to: determine a first characteristic region of an $i^{th}$ image in the n images and a second characteristic region of an $(i+1)^{th}$ image in then images, wherein $1 \leq i < n$, and a similarity between the first characteristic region and the second characteristic region is greater than a similarity threshold; determine a sub-trajectory of the light-emitting component corresponding to the $i^{th}$ image based on a position of the first characteristic region in the $i^{th}$ image and a position of the second characteristic region in the $(i+1)^{th}$ image; and determine the movement trajectory based on sub-trajectories corresponding to first n−1 images in the n images.

Optionally, the optical information further includes: information about at least one of a wavelength, a reflection angle, or a light intensity of the reflected light corresponding to a first image in the n images. As shown in FIG. 12, the apparatus for determining a movement trajectory further includes: a correcting module 1203 configured to correct last n−1 images of the n images based on the information.

Optionally, as shown in FIG. 12, the apparatus for determining a movement trajectory further includes: a first controlling module 1204 configured to control the photosensitive component to acquire the optical information about the reflected light of the probe light in response to receiving the reflected light.

Optionally, the electronic device further includes: a light intensity sensor disposed in the body. The light intensity sensor is connected to the processor and configured to detect the light intensity of the reflected light; and the determining module 1202 is configured to determine the movement trajectory in response to the light intensity being greater than a light intensity threshold.

Optionally, the electronic device further includes: a power detection component and a prompting component disposed in the body. The power detection component is configured to detect remaining power of the power supply, and the power detection component and the prompting component are both connected to the processor. As shown in FIG. 12, the apparatus for determining a movement trajectory further includes: a second controlling module 1205 configured to control the prompting component to display prompt information in response to the remaining power being less than a power threshold.

In summary, in the apparatus for determining a movement trajectory according to the embodiment of the present disclosure, the acquiring module is capable of acquiring the optical information about the reflected light of the probe light emitted by the light-emitting component acquired by the photosensitive component in response to receiving the reflected light, and the determining module is capable of determining the movement trajectory of the light-emitting component based on the optical information. In this way, the electronic device is capable of acquiring the movement trajectory of the light-emitting component by the processor thereof, and no other device is needed in the process of acquiring the movement trajectory by the electronic device, thereby improving the use flexibility of the electronic device.

An embodiment of the present disclosure provides a non-transitory computer-readable storage medium. The non-transitory computer-readable storage medium stores a computer program, wherein the computer program, when running on a processor, causes the processor to perform any method for determining a movement trajectory according to the present disclosure.

An embodiment of the present disclosure provides a computer program product storing at least one instruction therein. The computer program product, when running on a computer, causes the computer to perform any method for determining a movement trajectory according to the present disclosure.

In the present disclosure, by "connecting", "connection", "connected" or variants thereof, it is intended to refer to a physical connection, an electrical connection, or a combination of a physical connection and an electrical connection. The electrical connection of two components means that the two components can transmit electrical signals to each other.

Disclosed above are merely exemplary embodiments of the present disclosure, but the protection scope of the present disclosure is not limited thereto. Any variations or substitutions that a person skilled in the art could easily derive within the technical scope of the present disclosure shall fall within the protection scope of the present disclosure. Therefore, the protection scope of the present disclosure should be subject to the appended claims.

What is claimed is:

1. An electronic device, comprising: a body, a light-emitting component, a photosensitive component, a light-emitting control component, and a processor;
wherein the light-emitting component, the photosensitive component, the light-emitting control component, and the processor are all disposed in the body, the photosensitive component is connected to the processor, and the light-emitting control component is connected to the light-emitting component;
the light-emitting component is configured to emit probe light;
the photosensitive component is configured to acquire optical information about reflected light of the probe light in response to receiving the reflected light;
the processor is configured to determine a movement trajectory of the light-emitting component based on the optical information; and
the light-emitting control component is configured to control the light-emitting component to emit the probe light, wherein the light-emitting control component comprises a pressure sensor disposed in a pressure sensing region on the body, the pressure sensor being configured to control the light-emitting component to emit the probe light in response to a pressure on the pressure sensing region being greater than a pressure threshold.

2. The electronic device according to claim 1, wherein the body comprises a barrel, and the light-emitting component is disposed at a tip of the barrel.

3. The electronic device according to claim 1, wherein the optical information comprises n images of the reflected light acquired in n times; and the processor is configured to:
determine a first characteristic region of an $i^{th}$ image in the n images and a second characteristic region of an $(i+1)^{th}$ mage in the n images, wherein $1 \leq i < n$, and a similarity between the first characteristic region and the second characteristic region is greater than a similarity threshold;
determine a sub-trajectory of the light-emitting component corresponding to the $i^{th}$ image based on a position of the first characteristic region in the $i^{th}$ image and a position of the second characteristic region in the $(i+1)^{th}$ image; and
determine the movement trajectory based on sub-trajectories corresponding to first n−1 images in the n images.

4. The electronic device according to claim 3, wherein the optical information further comprises: information about at least one of a wavelength, a reflection angle, or a light intensity of the reflected light corresponding to a first image in the n images; and the processor is configured to correct last n−1 images in the n images based on the information.

5. The electronic device according to claim 1, wherein the processor is further configured to control the photosensitive component to acquire the optical information.

6. The electronic device according to claim 1, further comprising at least one of:
an optical lens disposed in the body, wherein the photosensitive component is configured to receive the reflected light passing through the optical lens; or
a projection component disposed in the body, wherein the projection component is connected to the processor and configured to project the movement trajectory.

7. The electronic device according to claim 1, further comprising: a light intensity sensor disposed in the body, wherein the light intensity sensor is connected to the processor and configured to detect light intensity of the reflected light; and
the processor is configured to determine the movement trajectory in response to the light intensity being greater than a light intensity threshold.

8. The electronic device according to claim 6, wherein the electronic device comprises the optical lens, and the optical lens comprises a convex lens.

9. The electronic device according to claim 6, wherein the electronic device comprises the projection component, the body comprises: a barrel and a cap, and the projection component is disposed in the cap.

10. The electronic device according to claim 1, further comprising: a power supply configured to supply power to at least part of electrical components in the electronic device.

11. The electronic device according to claim 10, wherein the body comprises a barrel and a cap; and
the power supply is configured to supply power to the at least part of the electrical components when the cap is mounted on an end of the barrel opposing to an end of a tip of the barrel.

12. The electronic device according to claim 11, further comprising: a first port, a second port, a third port, and a fourth port; wherein
the first port, the power supply, and the second port are all disposed in the barrel, and the first port, the power supply, and the second port are connected in series; and
the third port and the fourth port are both disposed in the cap, and the third port is connected to the fourth port; and
the first port, the power supply, the second port, the fourth port, and the third port form a power supply circuit when the cap is mounted on the end of the barrel opposing to the end of the tip of the barrel, and the at least part of the electrical components are connected in series in the power supply circuit.

13. The electronic device according to claim 10, further comprising: a power detection component and a prompting component disposed in the body;
wherein the power detection component is configured to detect remaining power of the power supply, and the prompting component is configured to display prompt information in response to the remaining power being less than a power threshold.

14. The electronic device according to claim 13, wherein the power detection component and the prompting component are both connected to the processor, and the processor is configured to control the prompting component to display the prompt information in response to the remaining power being less than the power threshold.

15. The electronic device according to claim 1, further comprising: a memory disposed in the body, wherein the memory is connected to the processor and configured to store the movement trajectory.

16. The electronic device according to claim 15, further comprising at least one of:
a deletion component, wherein the deletion component is connected to the memory and configured to delete the movement trajectory in the memory; or
a transmission component, wherein the transmission component is connected to the memory and configured to transmit the movement trajectory to other devices other than the electronic device.

17. A method for determining a movement trajectory, applicable to an electronic device comprising a body, a light-emitting component, a photosensitive component, a light-emitting control component, and a processor, wherein the light-emitting component, the photosensitive component, the light-emitting control component, and the processor are all disposed in the body, the photosensitive component is connected to the processor, and the light-emitting control component is connected to the light-emitting component, the method comprising:

emitting probe light by the light-emitting component;

acquiring optical information about reflected light of the probe light by the photosensitive component in response to receiving the reflected light; and determining a movement trajectory of the light-emitting component by the processor based on the optical information; and the method further comprising:

controlling the light-emitting component to emit the probe light by the light-emitting control component, wherein the light-emitting control component comprises a pressure sensor disposed in a pressure sensing region on the body, the pressure sensor being configured to control the light-emitting component to emit the probe light in response to a pressure on the pressure sensing region being greater than a pressure threshold.

18. A method for determining a movement trajectory, applicable to a processor in an electronic device comprising a body, a light-emitting component, a photosensitive component, a light-emitting control component, and the processor, wherein the light-emitting component, the photosensitive component, the light-emitting control component, and the processor are all disposed in the body, the photosensitive component is connected to the processor, and the light-emitting control component is connected to the light-emitting component, the method comprising:

acquiring optical information about reflected light, wherein the optical information is information acquired by the photosensitive component in response to receiving reflected light of probe light emitted by the light-emitting component, and the probe light emitting by the light-emitting component is controlled by the light-emitting control component, wherein the light-emitting control component comprises a pressure sensor disposed in a pressure sensing region on the body, the pressure sensor being configured to control the light-emitting component to emit the probe light in response to a pressure on the pressure sensing region being greater than a pressure threshold; and determining a movement trajectory of the light-emitting component based on the optical information.

19. A non-transitory computer-readable storage medium storing a computer program, wherein the computer program, when running on a processor, causes the processor to perform the method for determining the movement trajectory as defined in claim 18.

\* \* \* \* \*